Feb. 27, 1962   A. G. LAUTZENHISER   3,023,284
ACCELERATION RESPONSIVE DEVICE WITH CONTROLLED TIME DELAY
Filed March 5, 1959
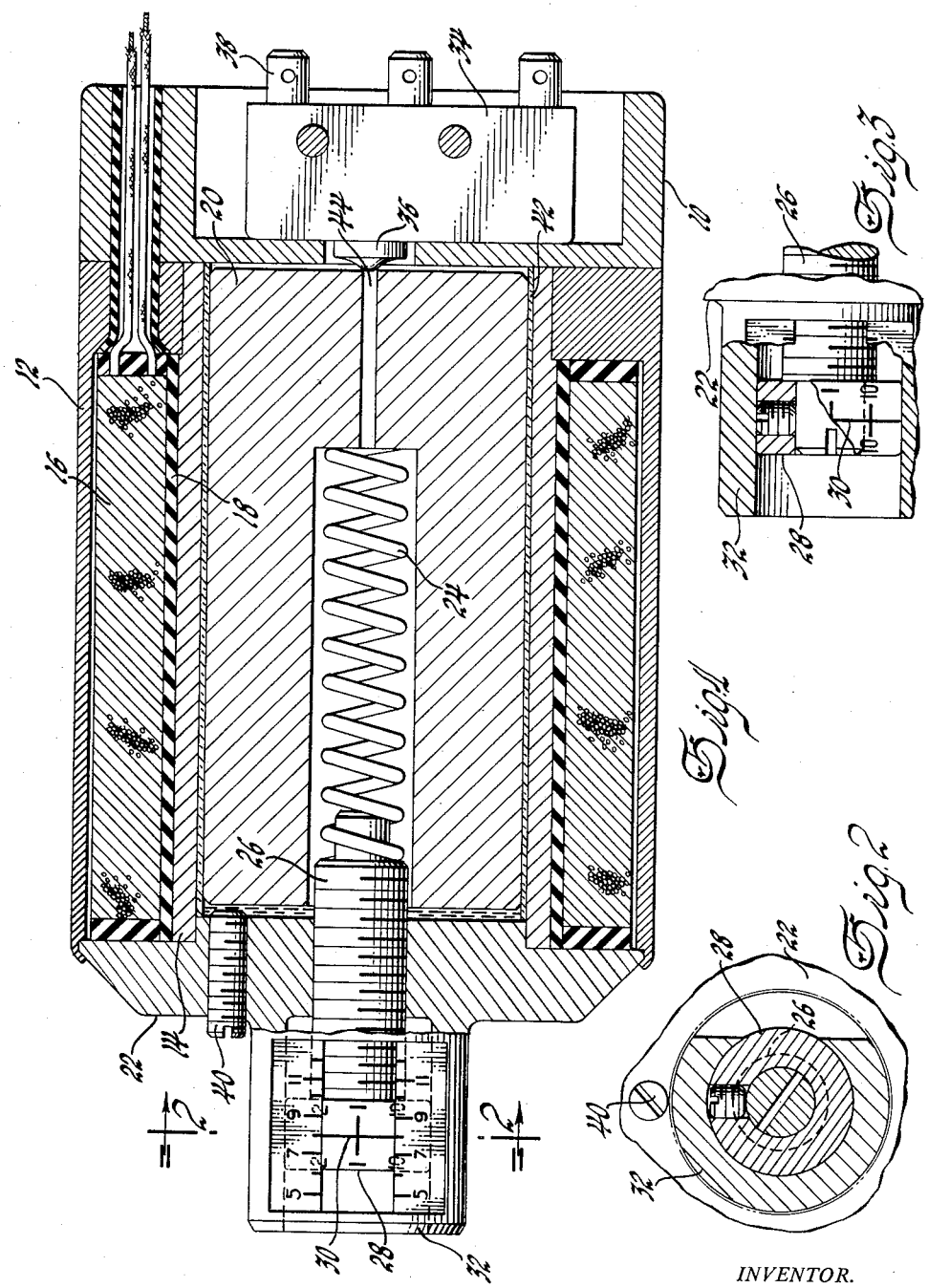
INVENTOR.
Cloyde G. Lautzenhiser
BY
Paul J. Ethington
ATTORNEY United States Patent Office 3,023,284
Patented Feb. 27, 1962

3,023,284
ACCELERATION RESPONSIVE DEVICE WITH CONTROLLED TIME DELAY
Argyle G. Lautzenhiser, Milwaukee, Wis., assignor to General Motors Corporation, Detroit, Mich., a corporation of Delaware
Filed Mar. 5, 1959, Ser. No. 797,391
5 Claims. (Cl. 200—61.53)

This invention relates to acceleration responsive devices and more particularly to an improved acceleration switch for control circuits.

In accordance with this invention, an acceleration responsive device provides a controlled time delay between the occurrence of a predetermined value of acceleration and operation of a switch. A seismic mass is resiliently constrained toward a reference position in which it operatively engages the switch actuator and when an increasing acceleration force exceeds the constraining force, the mass travels a distance determined by an adjustable stop means. Accordingly, when the acceleration force decreases below the constraining force, the time required for the mass to reach the actuator is determined by the distance of travel. The value of acceleration at which the switch is actuated is established by adjustment of the constraining force and the time delay interval is established by positional adjustment of the stop means. Additionally, means are provided for damping spurious vibrations of the seismic mass. For this purpose, the seismic mass, suitably in the form of a plunger, is slidably disposed within a chamber or cylinder and floated on an interposed damping fluid. Additional damping is provided by an axial passage through the plunger permitting restricted air flow between one end of the cylinder and the other. Testing of the switch operation is facilitated by simulating acceleration forces on the plunger. This is accomplished by using a magnetic plunger and a solenoid winding disposed about the cylinder and energized to exert desired forces on the plunger. This arrangement provides a compact and light weight acceleration responsive device of excellent reliability. The device is especially well adapted for use in control systems of guided missiles and the like.

A more complete understanding of the invention may be had from the detailed description which follows taken from the accompanying drawings in which:

FIGURE 1 is a side elevation view of the device in partial cross-section;

FIGURE 2 is a sectional view taken on lines 2—2 of FIGURE 1; and

FIGURE 3 shows details of the acceleration adjusting mechanism.

Referring now to the drawings, there is shown an illustrative embodiment of the invention in an acceleration responsive device wherein an electric switch is actuated at a predetermined value of increasing acceleration and is again actuated, with selected time delay, after decreasing acceleration of the same value. The device comprises a base 10 to which is secured a cylindrical casing 12 terminating in a base flange. A bushing or cylinder 14 is press-fitted into the flange of the casing and forms an annular compartment with the wall of the casing 12. A solenoid electromagnet winding 16 on an insulating bobbin 18 is disposed in the annular compartment and has lead wires extending through the base 10. A seismic mass or plunger 20 is slidably disposed with small clearance in the cylinder 14. An end plate 22 is seated upon the end of the cylinder and bobbin and is secured in place by the swaged end of casing 12.

The plunger 20 is axially movable within the cylinder and is constrained to a reference position against the base by a spring 24 which is interposed between the plunger 20 and an adjusting screw 26. The adjusting screw is provided with a tool socket and a head 28 which bears a vernier scale 30 and is movable within a sleeve 32 extending from plate 12. The sleeve is calibrated in units of acceleration. An electric switch 34, such as a conventional microswitch, is mounted in the base 10 and has an actuator 36 operatively engaged by the plunger 20 in its reference position. The microswitch is a single pole double throw snap-over switch which requires minute displacement of the actuator to switch its movable contact from one fixed contact to the other. The contacts are provided with external terminals 38 for connection with a desired control circuit. The travel of the plunger 20 is determined by an adjustable stop, such as a set screw 40 in the end plate 22. The plunger is floated on a coating of damping liquid 42, suitably a silicone liquid, which reduces static friction and inhibits spurious vibration of the plunger. Additional damping is afforded by a passage 44 in plunger 20 permitting restricted flow of air between opposite ends of the cylinder.

In order to test the operation of the switch, acceleration forces may be simulated by energizing the winding 16 with controlled values of current to exert a magnetic force upon the plunger 20. For this purpose, the plunger 20 is constructed of magnetic material and the cylinder 14 is of non-magnetic material. To provide a return path for the magnetic flux, the casing 12, base 10, and end plate 22 are also of magnetic material. The set screw 40 is non-magnetic and serves to prevent engagement of the plunger with the magnetic end plate during testing, in addition to its primary function of providing adjustment of the time delay.

The sensitive or input axis of the device coincides with the longitudinal axis of the plunger and cylinder. In operation, the sensitive axis is appropriately oriented and the value of acceleration at which switch is to occur is selected by adjustment of the spring force by the adjusting screw 26. The desired time delay between the occurrence of the selected value, during decreasing acceleration, and switch actuation is established by adjusting the position of the stop or set screw 40. When the acceleration force along the sensitive axis exceeds the constraining force, the plunger will move away from the reference position permitting switch actuation. Motion of the plunger will continue until it engages the stop and so long as the acceleration value exceeds the predetermined value, the plunger will rest against the stop. When the acceleration decreases and the spring force exceeds the acceleration force on the plunger, it will move back toward the reference position. The time required for the plunger to traverse the distance to the reference position is, of course, a function of the distance travelled and, accordingly, the switch is re-actuated after the prescribed time delay.

Although the description of this invention has been given the respect to a particular embodiment, it is not to be construed in a limiting sense. Numerous variations and modifications within the spirit and scope of the invention will now occur to those skilled in the art. For a definition of the invention, reference is made to the appended claims.

I claim:

1. An acceleration responsive device adapted to operate utilization means at a predetermined value of decreasing acceleration comprising a support member, a seismic mass movably supported thereby, force exerting means on the support member and operatively engaging the mass to urge it in one direction toward a reference position with a predetermined constraining force, utilization means including an actuator disposed on the support member for operative engagement by the seismic mass in its reference position, and stop means for limiting the travel of the seismic mass in the opposite direction when an increasing acceleration force exceeds the constraining force, first adjusting means for adjustably positioning the stop means for determining the time delay required for the mass to reach its reference position when a decreasing acceleration force falls below the constraining force, and second adjusting means operatively connected with the force exerting means for adjusting the constraining force independently of the first adjusting means.

2. An acceleration responsive switch device adapted to operate a switch at a predetermined value of decreasing acceleration comprising a support member, a seismic mass movably supported thereby, a spring on the support member engaging the mass to urge it in one direction toward a reference position with a predetermined constraining force, a switch including an actuator disposed on the support member for operative engagement by the seismic mass in its reference position, and stop means for limiting the travel of the seismic mass when an increasing acceleration force exceeds the constraining force, damping means coacting between the support member and the mass to inhibit vibration of the mass, first adjusting means for adjustably positioning the stop means for determining the time delay required for the mass to reach its reference position when a decreasing acceleration force falls below the constraining force, and second adjusting means operatively connected with the spring for adjusting the constraining force independently of the first adjusting means.

3. An acceleration responsive switch comprising a support member, a cylindrical sleeve mounted on the support member, a plunger slidably supported within the sleeve, a base disposed over one end of the sleeve and an end plate disposed over the other end of the sleeve and defining a chamber accommodating axial motion of the plunger, a switch mounted in the base and having an actuator, an adjusting screw extending through said plate, a spring interposed between the screw and the plunger urging the plunger into operative engagement with the actuator whereby the value of acceleration at which motion of the plunger occurs may be adjusted, said plunger defining a restricted passage communicating with opposite ends of the chamber, an adjustable stop extending through the end plate into the path of travel of the plunger to determine the stroke length of the plunger and hence the time delay between deceleration below said value and the actuation of the switch, and a solenoid coil disposed over said sleeve and adapted to exert magnetic force on said plunger against the spring to simulate acceleration force on the plunger.

4. An acceleration responsive device adapted to operate a switch at a predetermined value of decreasing acceleration comprising a support member, a cylindrical sleeve mounted on the support member, a plunger slidably supported within the sleeve, a base disposed over one end of the sleeve and an end plate disposed over the other end of the sleeve and defining a chamber accommodating axial motion of the plunger, a switch mounted in the base and having an actuator, an adjusting screw extending through said plate, a spring interposed between the screw and the plunger urging the plunger into operative engagement with the actuator whereby the value of acceleration at which motion of the plunger occurs may be adjusted, a damping liquid interposed between the plunger and the sleeve, said plunger defining a restricted passage communicating with opposite ends of the chamber, an adjustable stop extending through the end plate into the path of travel of the plunger to determine the stroke length of the plunger and hence the time delay between deceleration below said value and the actuation of the switch.

5. An acceleration responsive switch comprising a support member, a cylindrical sleeve mounted on the support member, a plunger slidably supported within the sleeve, a base disposed over one end of the sleeve and an end plate disposed over the other end of the sleeve and defining a chamber accommodating axial motion of the plunger, a switch mounted in the base and having an actuator, said end plate defining a pair of openings with an adjusting screw in one opening and extending through said plate, a spring interposed between the screw and the plunger urging the plunger into operative engagement with the actuator whereby the value of acceleration at which motion of the plunger occurs may be adjusted, a damping liquid interposed between the plunger and the sleeve, said plunger defining a restricted passage communicating with opposite ends of the chamber, an adjustable stop extending through the other opening in the end plate into the path of travel of the plunger to determine the stroke length of the plunger and hence the time delay between deceleration below said value and the actuation of the switch, and a solenoid coil disposed over said sleeve and adapted to exert magnetic force on said plunger against the spring to simulate acceleration force on the plunger.

References Cited in the file of this patent

UNITED STATES PATENTS

| | | |
|---|---|---|
| 2,850,590 | Marks et al. | Sept. 2, 1958 |
| 2,854,539 | Ruppel | Sept. 30, 1958 |
| 2,930,863 | Pasieka | Mar. 29, 1960 |